Patented Apr. 28, 1953

2,636,876

UNITED STATES PATENT OFFICE 2,636,876

PREPARATION OF RESINOUS AROMATIC POLYPHOSPHATES

Henryk Zenftman, Saltcoats, and Andrew McLean, West Kilbride, Scotland, assignors to Imperial Chemical Industries Limited, a corporation of Great Britain No Drawing. Application October 27, 1948, Serial No. 56,907. In Great Britain January 2, 1948

1 Claim. (Cl. 260—61)

The present invention relates to the production of new artificial resinous materials which exhibit an especially favourable combination of physical and chemical properties.

The new artificial resinous materials produced according to the present invention are poly-condensation products that have the chemical character of linear aromatic polyphosphates in which the phosphorous atoms are in the long chain and linked to two chain-forming aromatic esterifying groups and to one branch aromatic esterifying group.

These new materials are insoluble in water, alcohol, ether, paraffins, but are soluble in chloroform, dioxane and mixtures of benzene and alcohol in certain proportions and various other mixtures of organic liquids which individually fail to dissolve them. They can also be dissolved in relatively small proportions of benzene and toluene to form concentrated solutions. Solutions of these resins are clear, transparent, viscous liquids. The new resinous materials become soft and fusible when sufficiently heated. They do not exhibit heat hardening properties but by chemical modification they may be made heat infusible. By using volatile solvents the resins can be applied by means of spraying, brushing or dipping as coating on metals, glass, wood, rubber and many other surfaces and the coatings so obtained are of high gloss and good flexibility and are well adapted for protecting metal surfaces against corrosion. The resins are of extremely good clarity, high refractivity and are usually of a pale or colourless appearance. They are highly resistant to water and acids. They are of low inflammability and can be heated to about 300° C. without decomposition. Several of them are non-inflammable when they are decomposed by heating them in flame. At room temperature the resins are of varying hardness depending on the components used in their production.

The new resinous materials can also be used as cements for bonding purposes. They can be used as invisible cements for glass, some of them having identical refractive index with glass. They can also be used for bonding metals, rubber, wood and other materials. They are excellent binding agents for insoluble fillers, pigments and the like; and by incorporating these into the artificial resinous materials produced according to the invention at temperatures above the softening point, thermoplastic compositions of high toughness and attractive mechanical properties are obtained.

These thermoplastic compositions may be used for making gramophone records and similar articles which can be moulded to give sharp contours.

They are compatible with many other organic film forming materials, for instance they are miscible in all proportions with industrial nitrocellulose and miscible in certain proportions with ethyl cellulose, polyvinyl chloride and various other polymers. If desired plasticisers for such film forming materials can be maintained in solution along with the new artificial resinous materials. Coatings containing the new artificial resinous materials and nitrocellulose are less inflammable than nitrocellulose coatings, in other words these new artificial resinous materials have a flame-retarding effect on the nitrocellulose.

According to the present invention the process for the production of the new artificial resinous materials comprises condensing an aromatic-oxy-phosphoryl dichloride and a dihydroxy-aromatic compound both hydroxyl groups of which are nuclear and are attached to non-adjacent carbon atoms.

Preferably the aromatic-oxy-phosphoryl dichloride and the dihydroxy-aromatic compound are in equimolecular proportions.

The said condensation is preferably effected by heating a mixture of the said compounds until the required resinous properties have been developed in the reaction mixture. Preferably the reaction is effected by heating for several hours at temperatures rising progressively as the reaction proceeds from say 100° C.–180° C. at the start to say 190° C.–240° C. It is desirable slowly to stir the reaction mixture particularly as its viscosity begins to increase. It is to be understood that moisture must be excluded during the reaction. It is preferable to carry out the reaction in an inert atmosphere as for example nitrogen or carbon dioxide. The reaction is also preferably carried out at normal pressures but it is preferable to apply suction after completion of the reaction to remove traces of hydrogen chloride from the viscous product. The presence of hydrogen chloride elimination catalysts as for example metallic tin, calcium chloride, boron trifluoride and zinc chloride or aluminium chloride, the latter two in very small proportions, is sometimes desirable to assist the progress of the reaction.

The said condensation may also be effected by treating the aromatic-oxy-phosphoryl dichloride with the dihydroxy-aromatic compound, in a common solvent and including in said solvent a hydrogen chloride "acceptor."

As examples of a common solvent may be mentioned: ether, benzene, chloroform. The "acceptor" may be for example a tertiary amine as for example pyridine.

The new resinous materials formed according to the process of the present invention may, if desired, be purified. For example they may be dissolved in benzene and subsequently precipitated from these solutions by the addition of ether. The precipitate, which is in the form of a thick ether solvated fluid may be further washed with ether and subsequently dried under normal or reduced pressure. If it is desired further to reduce the acid number of these resins this may be done by treating the solutions of the resins in organic solvent with anhydrous sodium carbonate.

The new artificial resinous materials may be considered to contain a recurrent grouping

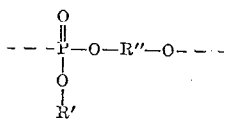

where R′ is the aromatic radicle present in the aromatic-oxy-phosphoryl dichloride

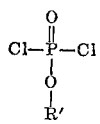

and R″ is the aromatic radicle present in the aforesaid dihydroxy-aromatic compound.

The aforesaid dihydroxy-aromatic compound whereof both hydroxyl groups are nuclear and attached to non-adjacent carbon atoms, may have one or more aromatic nuclei in its molecule, and in the latter case its hydroxy groups may advantageously be present in different nuclei; e. g., in the para or meta position to one another in a monocyclic dihydroxy-compound or in the 2:2′ or 4:4′ position in the case of a diphenyl derivative. Dihydroxy naphthalene compounds can also be used.

As the aromatic-oxy-phosphoryl dichloride there may be used for instance phenoxy-phosphoryl dichloride, para-chloro-phenoxy-phosphoryl dichloride or ortho-chloro-phenoxy-phosphoryl dichloride or any of the following new compounds: 2:4 dichloro-phenoxy-phosphoryl dichloride, 2:4:6 trichloro-phenoxy-phosphoryl dichloride, 2:4 dibromo-phenoxy-phosphoryl dichloride, ortho-methyl-phenoxy-phosphoryl dichloride, or 2-methyl 4:6 dichloro-phenoxy-phosphoryl dichloride. Mixtures of isomeric or differently substituted aromatic-oxy-phosphoryl dichlorides may also be used. These compounds may be prepared by treating phenol, para-cresol, 2:4 dichlorophenol, 2:4:6-trichloro-phenol, 2:4-dibromo-phenol, ortho, chloro-phenol, ortho-cresol or 2-methyl-4:6-dichloro-phenol or mixtures of any of these, at raised temperature with more than one molar proportion of phosphorus oxychloride, if necessary in presence of a catalyst, until the whole of the aromatic hydroxy compound present has been consumed.

As the dihydroxy-aromatic compound in which both hydroxyl groups are nuclear and attached to non-adjacent carbon atoms there may be used, for instance, hydroquinone or resorcinol or chlorinated hydroquinone or dihydroxynaphthalene or dihydroxy diphenyls for instance 2:2′- dihydroxy diphenyl; 4:4′-dihydroxy-diphenyl or chlorinated dihydroxy-diphenyl.

The invention is illustrated by the following examples.

*Example 1*

A mixture of equimolar proportions of phenoxy-phosporyl dichloride (boiling point 244° C.) and hydroquinone is heated on an oil bath in a glass vessel provided with slow stirring, and an air condenser from the end of which a tube leads to a hydrogen chloride absorption liquor. The contents of the vessel are protected from access of moisture by a calcium chloride tube. Hydrogen chloride begins to be evolved at a bath temperature about 120–130° C., and as the reaction proceeds for a few hours at this temperature the reaction mixture gradually becomes a clear liquid which increases in viscosity as time goes on. The bath temperature is gradually increased to 205–215° C. in order to maintain sufficient fluidity of the reaction mixture and permit the reaction to proceed. Heating is discontinued after a total heating time of 20–26 hours, when evolution of hydrogen chloride practically ceases and the viscosity at 215° C. of the reaction mixture ceases to rise.

The resulting crude resinous product while fluid is poured out of the vessel and is allowed to cool to room temperature. It forms a straw coloured transparent resin having good adhesion to glass and metals. Its softening point as determined by the ball and ring method is 60° C. and it has noticeable cold flow properties. The acid number of the crude resin is 12 and it contains 0.1% of its weight of unreacted hydroquinone and phenoxy-phosphoryl dichloride.

A sample of the crude resinous material is purified by dissolving it in benzene and extracting the resulting solution with ether, which removes practically all the progenitor compounds and substantially reduces its acid number as it removes the benzene. The residue from the extraction retains sufficient of an ethereal medium to maintain it as a swollen fluid layer distinct from the supernatant layer of spent ether. This still fluid swollen residue is taken up into solution in a benzene alcohol mixture and a small excess of anhydrous sodium carbonate is added and left in contact with the solution for about an hour, as a result of which the resinous product after drying under reduced pressure has an acid number of 2. The following analytical data is obtained for the dry purified resin before the treatment with sodium carbonate: C=57.8 percent, H=3.6 percent, P=12.2 percent. Calculated for $C_6H_5O-P(=O)-OC_6H_4O-$ or $C_{12}H_9O_4P$, C=58.0 percent, H=3.2 percent, P=12.5 percent.

*Example 2*

An equimolecular mixture of para-chloro-phenoxy-phosphoryl dichloride (boiling point 265° C.) and hydroquinone is heated in a vessel similar to that used in Example 1 in which an atmosphere of nitrogen is maintained. The bath temperature at which reaction begins is 130–140° C. and heating is continued for 12 to 15 hours at a temperature rising to 205–215° C., by which time the reaction appears to be complete. The crude transparent resin is nearly colourless and forms a hard, glossy and very tough coating on metals. Its softening point is 80° C. and its acid number is 14. When purified and treated with anhydrous sodium carbonate as described in Example 1, its acid number is zero. A fragment of

Example 3

An equimolecular mixture of 2:4-dichloro-phenoxy-phosphoryl dichloride (boiling point 138° C. at 1.6 mm.), and hydroquinone is heated under a stream of nitrogen for 10 hours at a bath temperature rising from 130–135° C. at the start of the reaction to 210–220° C. at the end, with the exclusion of moisture. The resulting crude non-inflammable resin has an acid number of 8 and a softening point of 105° C. It is somewhat harder than the resin described in Example 2 and has a greater flame quenching effect in admixture with nitrocellulose, but otherwise is very similar in appearance and properties to the resin described in Example 2.

Example 4

An equimolecular mixture of 2:4:6-trichloro-phenoxy-phosphoryl dichloride (melting point 68–70°, boiling point 118° at 0.1 mm.) and hydroquinone is heated with exclusion of moisture after the fashion described in Example 1, the bath temperature being 160° at the start of the reaction and rising to 195°–200° at the end, and the time of heating required being 10 hours. The crude resin is straw coloured and has a softening point of 115° C. It is non-inflammable and has an even greater flame quenching effect in admixture with nitrocellulose than the resin described in Example 3.

Example 5

An equimolecular mixture of phenoxy-phosphoryl dichloride and 4:4'-dihydroxy-diphenyl is used and a stream of nitrogen is passed over the stirred reacting mixture, in the usual manner. The initial and final temperatures are 170° C. and 220° C. and the time of heating is 16 hours. The resin is brown in colour and is transparent in thin films. It gives hard and tough coatings adhering excellently to metals and glass, and has extremely good resistance to dilute mineral acids. Its softening point is 110° C.

Example 6

An equimolecular mixture of para-chloro-phenoxy phosphoryl dichloride and 4:4'-dihydroxy-diphenyl is employed, with the addition of 1% of boron trifluoride diacetate reckoned on the total weight of the reaction mixture, and a stream of nitrogen is maintained with the exclusion of moisture. The reaction begins at a bath temperature of 180° C., but to maintain the reaction the presence of the boron trifluoride catalyst is required. The final temperature is 200° C. and the time of heating is 12 hours. The crude resinous product has a softening temperature of 125° C. and is of a deep wine red colour in bulk. Thin films are transparent and pink in colour and form hard but tough adherent coatings on metal surfaces.

Example 7

Orthocresoxy-phosphoryl dichloride (boiling point 256° C.) is substituted for the phenoxy-phosphoryl dichloride in Example 1 and nitrogen is passed over the reaction mixture, but the procedure is otherwise the same. The resulting nearly colourless transparent crude resin softens at 75° and has an acid number of 11. It is somewhat harder than the resin described in Example 1 and does not show cold flow. A fragment of the resin heated in a naked flame burns weakly with a luminous flame when it is withdrawn from the naked flame.

Example 8

An equimolecular mixture of para-chloro-phenoxy phosphoryl dichloride and resorcinol is heated at a temperature rising from 165° to 195° for 20 hours after the fashion described in Example 1. The resulting crude transparent resin is of reddish brown colour and has excellent adhesion to glass and metal. Its softening point is 55° C. and its acid number is 28. It is a little harder than the resin of Example 1.

Example 9

An equimolecular mixture of 2:4-dibromo-phenoxy-phosphoryl dichloride (boiling point 122° C. at 0.16 mm. mercury) and hydroquinone is heated at a temperature rising from 95° C. to 200° C. over a period of 13 hours in a stream of nitrogen. The resulting crude resin softens at 105° C. and is of a pale straw colour, and has an acid number of 14. The hardness and adhesion of the resin are about the same as in Example 3 and it is likewise non-inflammable.

Example 10

A mixture of 1.000 gm. of 2:4 dichlorophenoxy phosphoryl dichloride and 393 gm. hydroquinone is heated on a metal bath in a glass vessel provided with stirring under an atmosphere of nitrogen. The bath temperature is maintained at 130–160° C. for six hours and then at 180–195° C. for 10 hours, by which time the liberation of hydrogen chloride practically ceases. The vessel is now connected with a vacuum pump and kept for 1 hour under reduced pressure at a temperature about 180–170° C. The resulting resinous product is poured out on a cold aluminium surface and after cooling broken up into chips. The resin is of good clarity, of pale straw colour when in bulk but usually colourless when broken up. Its acid number is 11 and softening temperature 104° C. After dissolving in benzene, washing with ether and drying its acid number is 8 and softening temperature 100° C.

The following analytical data is obtained for the dry purified resin: $C=45.0$ percent; $H=2.5$ percent; $P=9.2$ percent; and $Cl=22.6$ percent. Calculated for $Cl_2C_6H_3O—P(=O)—OC_6H_4O—$ or $C_{12}H_7Cl_2O_4P$, $C=45.4$ percent; $H=2.2$ percent; $P=9.7$ percent; and $Cl=22.4$ percent.

Example 11

A mixture of 47 gm. 2:4 dichloro-phenoxy-phosphoryl dichloride and 31.2 gm. of recrystallised colourless 4:4' dihydroxydiphenyl is heated in a similar way as described in Example 10 except that about 2 gm. of metallic tinfoil is added and the bath temperature is maintained at 190–195° C. for about 8 hrs. The resin obtained is hard and tough and nearly colourless. After dissolving in benzene, washing with ether and drying, its acid number is 9 and softening temperature 160° C.

Example 12

To a flask provided with a stirrer is added 38.8 grams hydroquinone, 500 ml. benzene and 56 grams of pyridine. A solution of 74.5 grams phenoxy-phosphoryl dichloride in 250 ml. benzene is then gradually added under stirring to the contents of the flask and stirring continued for 3 hours. A yellow tinted oily layer separates from the supernatant benzene. The content of the flask is then heated with continued stirring for 30 min. at 60° C. The heavy oily layer is separated from the benzene layer and then washed in succession with benzene, water and ether and finally dried under reduced pressure. The resin obtained is similar in properties to that described in Example 1. It is however darker in colour and somewhat more tacky.

All the resins described in the foregoing examples are soluble in chloroform and in benzene alcohol mixtures (80:20 by volume). The optimum ratio of benzene to alcohol differs slightly for the various resins.

They can be also dissolved in benzene or toluene to form concentrated solutions and then diluted to a desired consistency with a mixture of benzene and alcohol. It is preferable not to store an alcohol-containing solution as it causes increase of acidity. Addition of alcohol should be carried out before application of the solution. Some of them are also soluble in butyl acetate, ethyl acetate and acetone forming clear solutions. Other solvent mixtures capable of dissolving them are mixtures of butyl or amyl acetate and aromatic hydrocarbons containing minor proportions of aliphatic alcohols, such as are used for dissolving nitrocellulose.

The resins may be rendered infusible by heating them in presence of various metallic oxides e. g. an oxide of lead, and this also has the effect of reducing their solubility in organic solvents. Thus, by incorporating a small proportion of such an oxide, e. g. 1.5% litharge in a composition based on any of these resins and thereafter baking at e. g. 80–200° C. for a period of time the resin containing composition may be rendered infusible.

The resins produced according to the invention from chlorinated or brominated aromatic-oxy-phosphoryl dichlorides are of greater hardness, higher softening temperature and of less inflammability than when produced from non-chlorinated or non-brominated aromatic-oxy-phosphoryl dichlorides. Furthermore the higher the chlorine or bromine content of these resins the more pronounced are these properties.

We claim:

A process for the preparation of resinous aromatic polyphosphates which comprises heating in the absence of moisture substantially equimolecular proportions of an aromatic-oxy phosphoryl dichloride selected from the group consisting of para-chloro-phenoxy phosphoryl dichloride and 2:4 dichloro-phenoxy-phosphoryl dichloride and a dihydroxy-aromatic compound free of reactive constituents both hydroxyl groups of which are nuclear and are attached to non-adjacent carbon atoms, the heating being carried out initially at a temperature sufficient to cause condensation with liberation of hydrogen chloride and the entire reaction being carried out in the presence of a hydrogen chloride elimination catalyst selected from the group consisting of metallic tin, calcium chloride, boron, trifluoride, zinc chloride and aluminum chloride.

HENRYK ZENFTMAN.
ANDREW McLEAN.

References Cited in the file of this patent

UNITED STATES PATENTS

| Number | Name | Date |
| --- | --- | --- |
| 2,058,394 | Arvin | Oct. 27, 1936 |
| 2,272,668 | Honel | Feb. 10, 1942 |
| 2,435,252 | Toy | Feb. 3, 1948 |